(12) United States Patent
Birk et al.

(10) Patent No.: US 8,503,084 B2
(45) Date of Patent: Aug. 6, 2013

(54) OPTICAL ARRANGEMENT AND METHOD FOR CONTROLLING AND INFLUENCING A LIGHT RAY

(75) Inventors: Holger Birk, Meckesheim (DE); Volker Seyfried, Nussloch (DE)

(73) Assignee: Leica Microsystems CMS GmbH, Wetzlar, DE (US)

( * ) Notice: Subject to any disclaimer, the term of this patent is extended or adjusted under 35 U.S.C. 154(b) by 198 days.

(21) Appl. No.: 12/513,495

(22) PCT Filed: Aug. 28, 2007

(86) PCT No.: PCT/EP2007/058940
§ 371 (c)(1),
(2), (4) Date: Jul. 13, 2009

(87) PCT Pub. No.: WO2008/052821
PCT Pub. Date: May 8, 2008

(65) Prior Publication Data
US 2010/0073757 A1   Mar. 25, 2010

(30) Foreign Application Priority Data

Nov. 3, 2006 (DE) .......................... 10 2006 052 300
Jan. 10, 2007 (DE) .......................... 10 2007 002 583

(51) Int. Cl.
*G02B 27/14* (2006.01)
*G02B 26/00* (2006.01)

(52) U.S. Cl.
USPC ............ 359/629; 359/290; 359/291; 359/638

(58) Field of Classification Search
USPC .................. 359/290, 291, 495, 629, 634–638
See application file for complete search history.

(56) References Cited

U.S. PATENT DOCUMENTS

| | | | |
|---|---|---|---|
| 5,818,627 A * | 10/1998 | Perlo et al. ................. | 359/292 |
| 6,396,053 B1 | 5/2002 | Yokoi | |
| 6,459,484 B1 | 10/2002 | Yokoi | |
| 7,289,090 B2 * | 10/2007 | Morgan ......................... | 345/82 |
| 2001/0004251 A1 * | 6/2001 | Kurematsu et al. ............. | 345/88 |
| 2002/0181876 A1 | 12/2002 | Chang | |
| 2007/0070348 A1 | 3/2007 | Seyfried | |
| 2007/0133086 A1 | 6/2007 | Wilhelm et al. | |
| 2008/0080059 A1 * | 4/2008 | Dixon et al. .................. | 359/629 |

FOREIGN PATENT DOCUMENTS

| | | |
|---|---|---|
| DE | 19835072 | 2/2000 |
| DE | 10313987 | 10/2004 |
| DE | 10337558 | 3/2005 |
| EP | 0548830 | 6/1993 |
| EP | 0916981 | 5/1999 |
| EP | 1795938 | 6/2007 |
| JP | 08129138 | 5/1996 |

* cited by examiner

*Primary Examiner* — Mahidere Sahle
(74) *Attorney, Agent, or Firm* — Schlee IP International, P.C.; Alexander R. Schlee

(57) ABSTRACT

An optical arrangement and a related method for operating this optical arrangement are suggested, particularly in microscopes, for use as at least one of a main beam splitter and a beam combiner. One or more light beams can be coupled into the arrangement and at least one of the light beams that were coupled in can be coupled out again after having passed through the optical arrangement. In the path of the coupled in light beams at least one controllable microstructured element is provided, allowing to switch beam paths within the optical arrangement. This allows controlling or influencing the one or more light beams that are coupled out.

22 Claims, 7 Drawing Sheets

OPTICAL ARRANGEMENT AND METHOD FOR CONTROLLING AND INFLUENCING A LIGHT RAY

CROSS-REFERENCE TO RELATED APPLICATIONS

This application is a national phase entry based on the International Patent Application PCT/EP2007/058940 filed on Aug. 28, 2007 that claims the priorities of the German patent application DE 102006052300.8 dated Nov. 3, 2006 and of the German patent application DE 102007002583.3 dated Jan. 10, 2007. The entire content of both prior German patent applications is herewith incorporated by reference.

BACKGROUND OF THE INVENTION

The invention relates to an optical arrangement, in particular for use as a main beam splitter and/or beam combiner in a microscope, wherein one or more light beams can be coupled into the arrangement and at least one of the light beams that were coupled in can be coupled out again after having passed through the optical arrangement. Further, the invention relates to a respective method.

In the field of microscopy, in particular, confocal microscopy, it is often necessary to split or combine light beams or individual parts thereof, most frequently chromatic portions of its spectrum. Beam splitting is often implemented by dichroic filters. Dichroic filters are narrow-band, high precision chromatic filters that work under the principle of interference. In contrast to conventional filters, the non-passing portions of the spectrum of the coupled in light beam is not absorbed but reflected by the filter. This allows cutting out a portion of the spectrum from the light beam. Dichroic filters comprise the distinctive disadvantages that these have fixed spectral properties. If these should be changed, the filter has to be replaced.

Therefore, in practical applications, AOBS (Accusto Optical Beam Splitters) are known. An AOBS consist of a crystal that is subjected to an acoustic wave. Therefore, the light beams passing through the crystal are deflected differently depending on their wavelength. This allows to couple out very narrow-banded portions of the spectrum of the coupled in light beams. If an AOBS is used in the reverse direction, light beams can be combined. By changing the frequency of the acoustic wave the position of the cut out spectral portion can be influenced. This allows implementing a beam splitter that can be controlled within a narrow range. One disadvantage is that AOBSs are expensive. Moreover, the cut out spectral portion is very narrow (typically less than 2 nm). Broad spectral portions cannot be generated with an AOBS.

SUMMARY OF THE INVENTION

Therefore, it is an object of the invention to arrange and advance an optical arrangement as described at the outset so that a light beam coupled out from the optical arrangement can be influenced in a relatively unlimited fashion and at low costs.

According to the invention, this object is achieved by the related arrangement being designed such that in the coupled in light beams at least one controllable microstructure element is provided, allowing to switch the beam paths within the optical arrangement, resulting in a controlling and/or influencing of one or more light beams that are coupled out.

From a method point of view, this object is achieved by enhancing the related method in that the light beam paths are switched by means of a microstructure element provided in the coupled in light beams of the optical arrangement and one or more chosen ones of the coupled in light beams or chromatic portions of the spectrum thereof are coupled out in a defined manner.

According to the invention, it has been discovered that it is possible to emulate the function of an AOBS by relatively simple means. For this purpose, a controllable microstructured element is disposed in the beam path of the coupled in light beam or light beams. The microstructured element comprises an array of segments capable of influencing the light beam by a control signal that is coupled in. Such a segment can for instance be a tiltable mirror face, a controllable microprism or the like. According to the invention, the coupled in light beams incident onto the segments. By influencing the segments of the microstructured elements it is possible to influence the beam paths within the optical arrangement in a simple matter. Therefore, it is possible to guide a coupled in light beam in a variety of manners within the optical arrangement.

The arrangement according to the invention can also be used for influencing the spectrum of a coupled in light beam. For this purpose, the coupled in light beam should be present in a chromatically spatially dispersed form. If the coupled in light beam is a polychromatic light beam, i.e. is not chromatically dispersed in space, this coupled in light beam can be passed through a dispersive medium for dispersing it chromatically in space. By placing the microstructured elements appropriately, individual chromatic portions of the spectrum can be guided in a defined manner within the optical arrangement. This allows cutting out individual chromatic portions of the spectrum from a coupled in light beam or influencing the intensity of such portions. The spectrum of a coupled in light beam can be influenced by the arrangement according to the invention in a relatively unlimited fashion.

Depending on the other purpose of use, a coupled in light beam, a cut out chromatic portion of the spectrum or the remaining part of a light beam can be coupled out from the arrangement. Likewise, it is possible by means of placing the individual components of the optical arrangement in an appropriate manner to combine a plurality of light beams to one single light beam. In this manner, it is particularly easy to influence the coupled out light beam and its specific spectrum. The optical arrangement can be used for narrow-band light sources as well as for broadband spectra.

Preferably, the beam paths can be switched within the optical arrangement that can be designed such that the light beam coupled out from the optical arrangement comes from a desired coupled in light beam. Therefore, by the appropriate influencing of the microstructured element one light beam can be chosen from a plurality of coupled in light beams and can be coupled out from the optical arrangement. In the alternative, individual chromatic portions of the spectrum of any properties of a coupled in light beam can be coupled out from the arrangement. These can be chosen with almost no restrictions because of the flexible structure of the arrangement. It is only necessary that the microstructured element is controllable in a sufficiently flexible manner. Adjacent chromatic portions of the spectrum or individual sections of bandwidths of various widths can be coupled out from the spectrum of a light beam. It is also possible to suppress spurious or undesired ranges of the spectrum. For example, image artifacts can be removed from the spectrum.

Preferably, the chromatic portions of the spectrum that are not to be coupled out from the arrangement in a particular operational mode can be guided into an absorber. This avoids that undesired scattered light is coupled into the optical arrangement. An absorber can be designed in the various manners that are known from practical applications. The component named absorber only needs the capability to absorb substantial parts of the incident light beams. The absorber can also be designed as a light trap.

In a particularly preferable embodiment, the microstructured element comprises a DMD (Digital Micromirror Device). A DMD consists of many small, individual mirror faces. DMDs that are known from practical applications comprise, for example, 1024×768 individual mirrors that comprise, for example, a size of 13.68 µm×13.68 µm. Each one of the mirrors can be controlled in its position separately by subjecting it to a control voltage. This allows reflecting of the incident light beams depending on the position of the individual mirrors in different directions.

Preferably, the individual segments of the microstructured elements—for example the individual mirrors of a DMD—can be controlled individually. For reducing the complexity when controlling the microstructured elements, it is also possible to control it in groups of segments. One group of segments can for instance be a column of microstructured elements or a portion thereof from such a line of microstructured elements.

For utilizing the microstructured elements better, these microstructured elements often having a fill factor of only 80%, microlenses can be allocated to the respective microstructured elements. It is possible to provide for each individual microstructured element a microlens. In the alternative, it is also possible to use one lens for several segments. For example, for one column of the microstructured elements a cylinder shaped lens can be provided. This is for instance useful when a microstructured element comprises the different fill factors depending on the direction. The microlenses can thereby be provided as substantially covering the entire face for focusing the incident light as effectively as possible onto the individual segments of the microstructured elements.

Preferably, the light beams coupled into the arrangement comprise several chromatic portions of the spectrum. It is possible that a light beam comprises only individual spectrum lines, while it is also possible that the light beams comprise broad wave bandwidths all the way up to white light. In particular, it is irrelevant whether a continuous spectrum is provided or the spectrum has separate, spaced apart wavelength bands or individual spectrum lines. The arrangement according to the invention sets no limits in this regard.

The coupled in light beams can be formed by a variety of different light sources. For instance, a coupled in light beam can comprise a laser beam. On the other hand, the coupled in light beam can be created by the light that is reflected from an illuminated sample or emitted therefrom. The latter occurs in case of an exciting fluorescent sample. Further, many additional different light sources are applicable.

The dispersive medium comprises, preferably, a prism or a grating. The dispersive medium can be designed in a dual-type arrangement. In case of prisms this means that two prisms are disposed point-symmetrically and spaced apart with respect to each other such that its side faces are extending substantially in parallel. As a result, the first prism widens the light beam by chromatic dispersion and this light beam incidents onto the second prism that creates a bundle of substantially collimated light beams from the diverging individual light beams. Individual dispersive mediums can be allocated to each coupled in light beam. However, for simplifying the arrangement and reducing the costs, it is also possible to use one dispersive medium for several light beams. In this case, it is also possible that the dispersive medium is penetrated by one light beam in one direction while the same dispersive medium is penetrated by another light beam in the opposite direction.

For simplifying the arrangement of the microstructured elements the dispersive media can be arranged such that the direction of the chromatic dispersion in space can be substantially the same for all coupled in light beams.

In general, the coupled in the light beams will be of locally very limited expansion that has, for example, a point shaped cross section. By means of the chromatic dispersion these light beams are diverged to lines that have in general low width. This results in that the microstructured element is only used relatively insufficiently, since the light exits only onto a small range of the segments. Therefore, behind the place of chromatic dispersion one or more lenses can be provided that widen the chromatically dispersed light beam substantially perpendicular to the direction of chromatic dispersion. This allows for use of the microstructured element substantially more effectively.

Preferably, in particular in case of a widened chromatically dispersed light beam, not only individual chromatic portions of the spectrum can be removed entirely, but it is also possible to influence their intensity. The light of a chromatic portion of the spectrum will generally not only incident onto one single segment of the microstructured elements. To the contrary, several segments that are located perpendicularly to the direction of the chromatic dispersion will be illuminated by the respective portion of the spectrum of a light beam. If now only individual or at least not all segments are tilted, so that not all reflected light beams are directed in the direction of the coupling out area, it is possible to influence the intensity of a portion of the spectrum in this fashion. In this manner, it is particularly possible to easily influence and correct the spectrum of a coupled out light beam. If it is for instance known that a particular light source comprises an undesirably high percentage of one color, this portion can be removed by appropriate shifting of the segments of the microstructured elements or can be reduced in intensity.

The light coupled out from the optical arrangement can again be used for various purposes. For instance, a sample can be illuminated. On the other hand, the coupled out light can be guided to a detector. Further, the coupled out light beams can be used for various additional purposes.

For utilizing the optical arrangement, it is possible to switch between the various operational modes. This can be conducted one single time, repeatedly or periodically with intervals of different time working under a particular operational mode. In one operational mode, the microstructured element can be switched such that a coupled in light beam is coupled out again for the purpose of illuminating a sample. In another operational mode, the light that is reflected from the sample or emitted from the sample can be guided to a detector. This allows for instance to excite a fluorescent sample by means of a laser beam in one operational mode, while in another operational mode, the fluorescent light emitted from the sample is guided to a detector. In another possible application, the microstructured element can be used such that a plurality of coupled in light beams are combined to one light beam. In both cases, guiding of one light beam can also be applied to individual lines of the spectrum or even individual parts of a spectrum line.

There is a variety of possibilities to apply the teaching of the present invention in an advantageous manner and to advance this teaching. In this connection, it is referred to the dependent claims depending on claims 1 and 17 on the one hand and on the other hand to the subsequent explanations of an advantageous embodiment of the invention by referring to the drawings. In connection with this explanation of the preferred embodiment of the invention by referring to the drawings also generally advantageous embodiments and enhancements of the teaching are discussed.

DETAILED DESCRIPTION OF THE DRAWINGS

Figure 1:
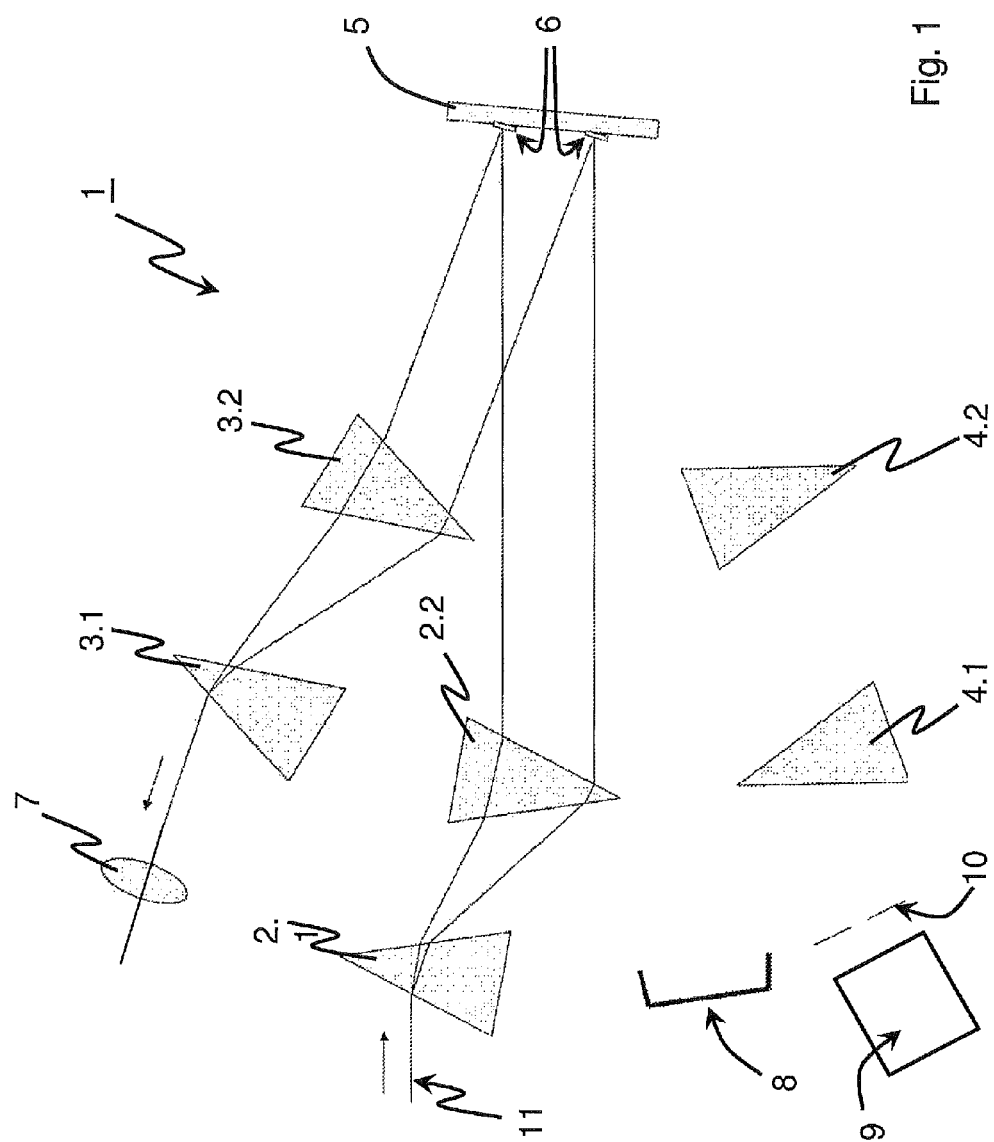
FIG. 1 an arrangement according to the invention with a couple in light beam for illuminating a sample, FIG. 2 an arrangement according to FIG. 1 with a coupled in light beam that emanates from the sample, FIG. 3 an arrangement according to FIG. 1 with a coupled in light beam that is guided into an absorber, FIG. 4 an arrangement according to FIG. 1 with a light beam emanating from an object and being guided to a detector, FIG. 5 an arrangement according to the invention for switching between two coupled light beams, wherein a first coupled in light beam is guided to an absorber, FIG. 6 an arrangement according to FIG. 5, wherein a second coupled in light beam is directed into an absorber, and FIG. 7 a microstructured element used in the arrangement according to the invention and having 16×8 individual segments.

FIGS. 1 to 4 show an arrangement according to the invention that is designed as a main beam splitter provided in a microscope. The optical arrangement 1 comprises three pairs of prisms 2, 3, 4. The prisms 2.1, 2.2, 3.1, 3.2, 4.1, 4.2 for all of the prism pairs 2, 3, 4 are each designed equally and the prisms of a respective prism pair are disposed point-symmetrically in a distance to each other. The particular prism assemblies 2, 3, 4 are offset with respect to each other, allowing the light beams passing through the prisms to be spectrally dispersed in space and incident onto a common microstructured element 5. The direction of dispersion by the prism pairs 2, 3, 4 is substantially equal.

The microstructured element 5 comprises a plurality of individual segments, each of them controllable individually. In the shown embodiment, the microstructured element is a DMD (Digital Micromirror Device), wherein the FIGS. 1 to 6 show as an example two individual mirrors 6. The DMD comprises, however, a plurality of individual mirror segments. These are provided in the plane of projection in the drawing as well as perpendicular thereto. FIG. 7 shows as an example such a DMD wherein an array of 16×8 individual mirror segments 6 are shown.

The optical arrangement 1 comprises in addition an objective 7, an absorber 8 and a detector 9 as well as the related detector aperture 10. Furthermore, an electronic control unit (not shown) is provided and controls the individual segments 6. The interaction between the individual components is described in more detail in the following.

FIG. 1 shows such an arrangement that is penetrated by an exciting beam 11. The light beam 11 is generated by a non-shown laser light source and is coupled into the optical arrangement 1. The light beam 11 incidents first onto the prism 2.1 chromatically dispersing the light beam in space. By means of a second prism 2.2 the dispersed light beam is substantially collimated. This light beam incidents onto the segments 6 of the microstructured elements 5 assuming a first position. The light beam is then reflected from the segments and incidents onto another prism 3.2 that combines together with a prism 3.1 the individual chromatic portions of the spectrum to one single light beam. This light beam that passes through an objective 7 is used for illuminating a sample that is not shown in the drawings.

Figure 2:
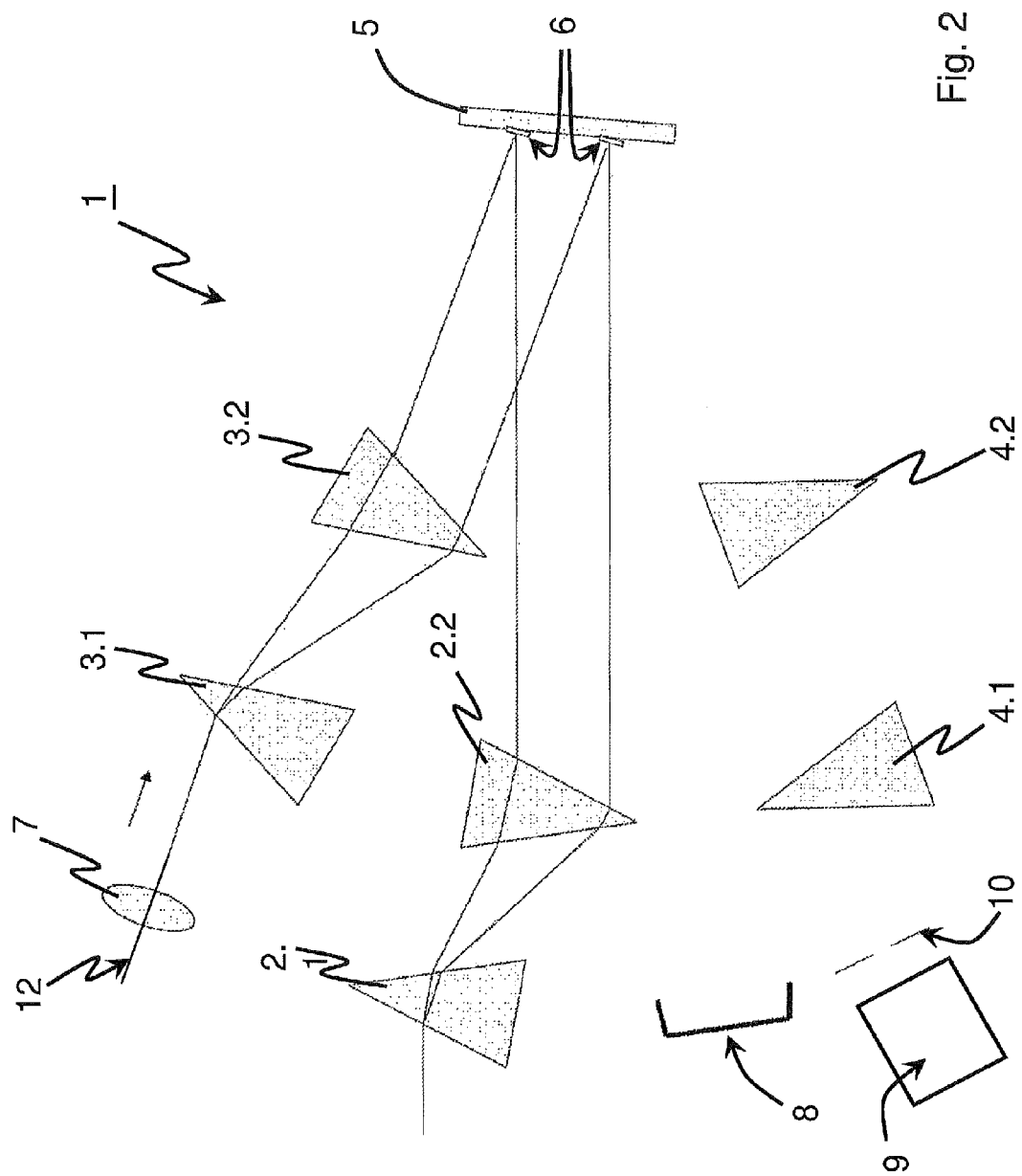
Figure 3:
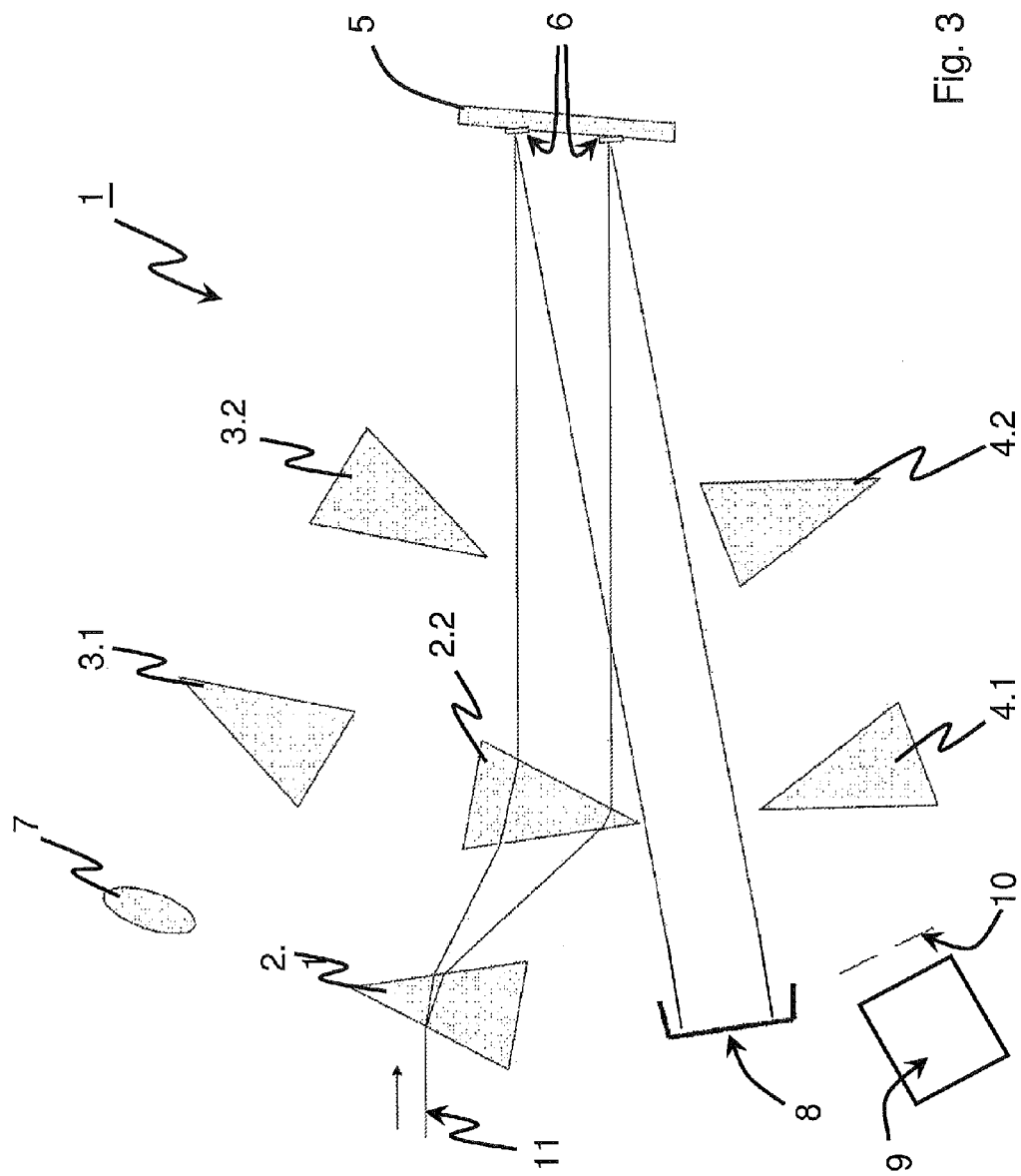

FIG. 2 shows the same arrangement as FIG. 1, wherein, however, the arrangement is penetrated in the reverse direction. The light beam 12 emanates from a sample. It incidents first onto the objective 7 and is then chromatically dispersed in space by the prism pair 3. The segments 6 of the microstructured elements 5 still remain in a first position so that the light beam can be coupled out from the optical arrangement 1 via the prism pair 2. No detection of the light 12 emitted by the sample is conducted.

FIG. 3 shows again an arrangement according to FIG. 1, wherein, however, the segments 6 of the microstructured elements 5 assume a second position. A light beam coming from a light source passes again through the prism pair for a chromatic dispersion, but is then not directed by the segments 6 in direction of the prism pairs 3 and therefore not in the direction of the objective. In contrast, the light beams are directed into an absorber 8. Therefore, in the second position, no illuminating of the sample is conducted.

Figure 4:
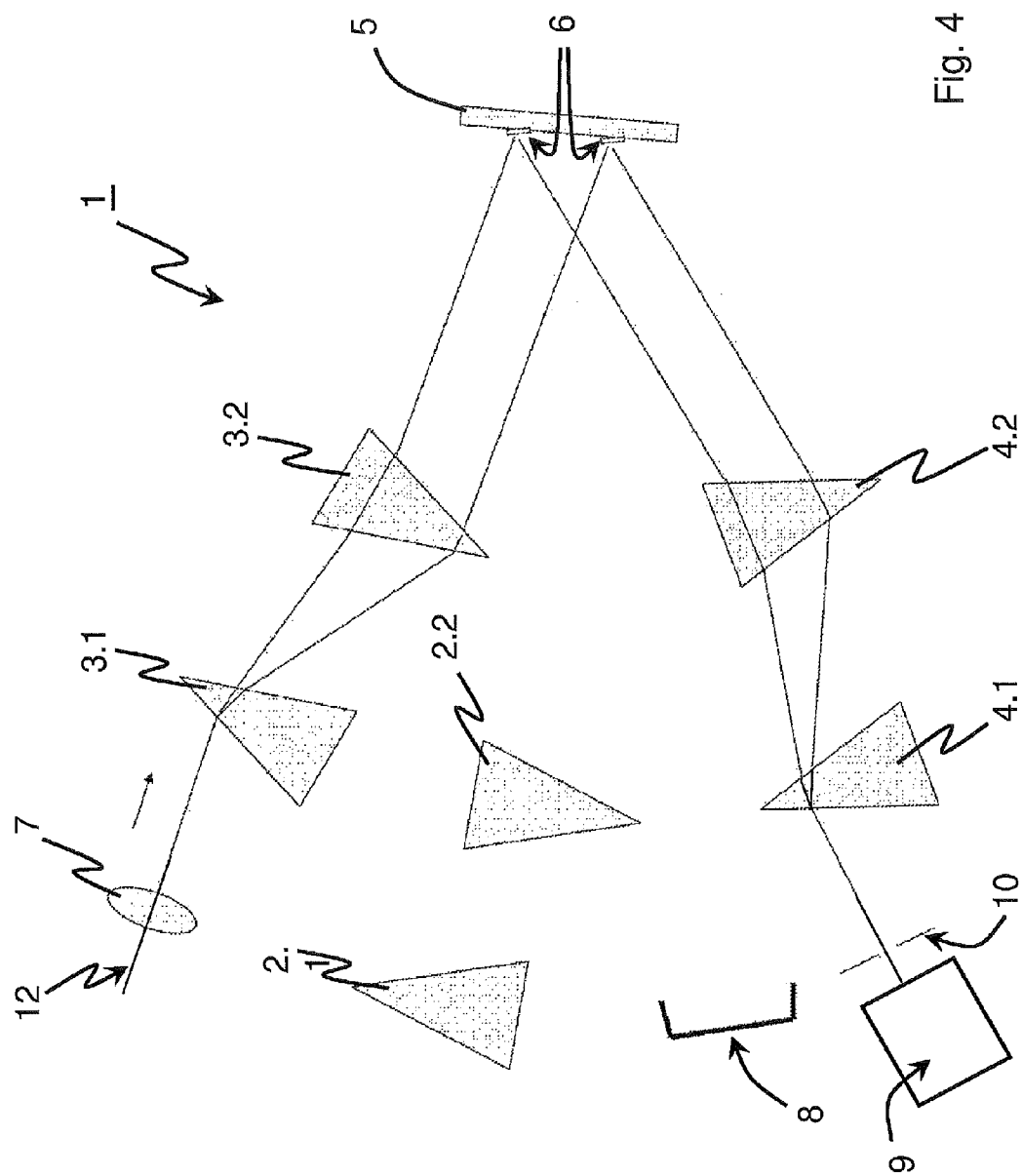

However, in the second position of the segments, a light beam 14 emanating from the sample can be directed into the detector 9. The related beam path is shown in FIG. 4. The light beam 14 passes first through the objective 7, is then chromatically dispersed in space by the prism pair 3 and incidents and then onto the segments 6 that assume the second position. This results in that the light beams are directed into the prism pair 4 that combines the individual chromatic portions of the spectrum to a single light beam. This light beam passes through the detector aperture 10 and incidents onto the detector 9. Instead of combining the light beam reflected by the microstructured element by means of the prism pair, it is also possible to guide the chromatically dispersed light beam directly into the detector 9.

The FIGS. 1-4 only show beam paths that result when all the segments 6 of the microstructured elements assume a first or a second position. However, it is also possible that some individual segments 6 assume a first position, while other individual segments 6 assume a second position. This can be useful if an illuminating light beam 11 comprises for example white light and a fluorescent sample should be excited therewith. If it is for instance known that a fluorescent dye emits green light when excited, it is possible to direct these particular chromatic portions of the spectrum directly into the detector 9. The segments falling onto the spectral lines to be detected can then be moved into a second position so that the light emitted by the sample is guided into the detector 9. If the segments 6 assume the second position the chromatic portions of the spectrum of the exciting beam 11 are directed into the absorber 8. By means of this design according to the invention it is also possible to illuminate a sample and simultaneously detect the fluorescent light.

Figure 5:
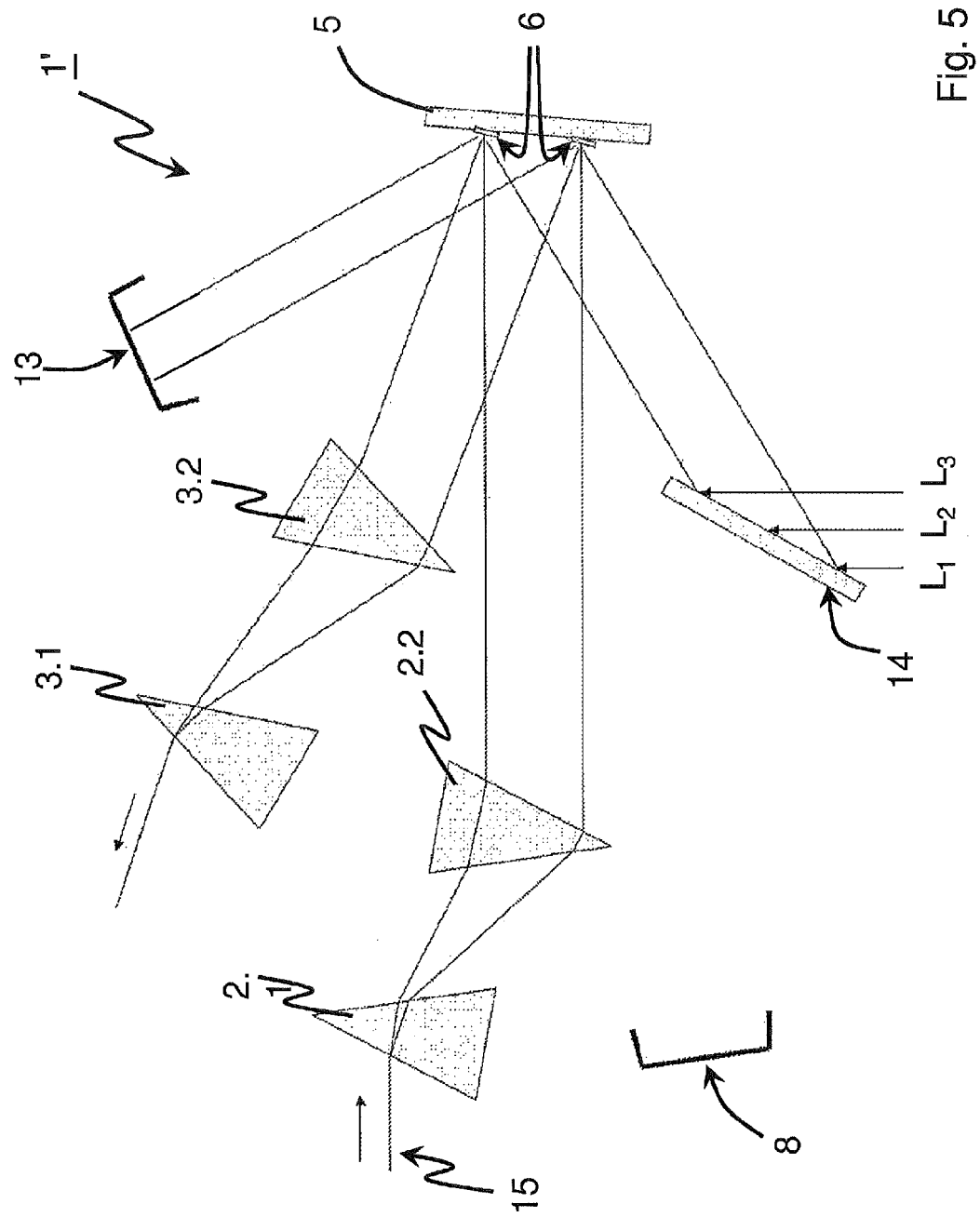
Figure 6:
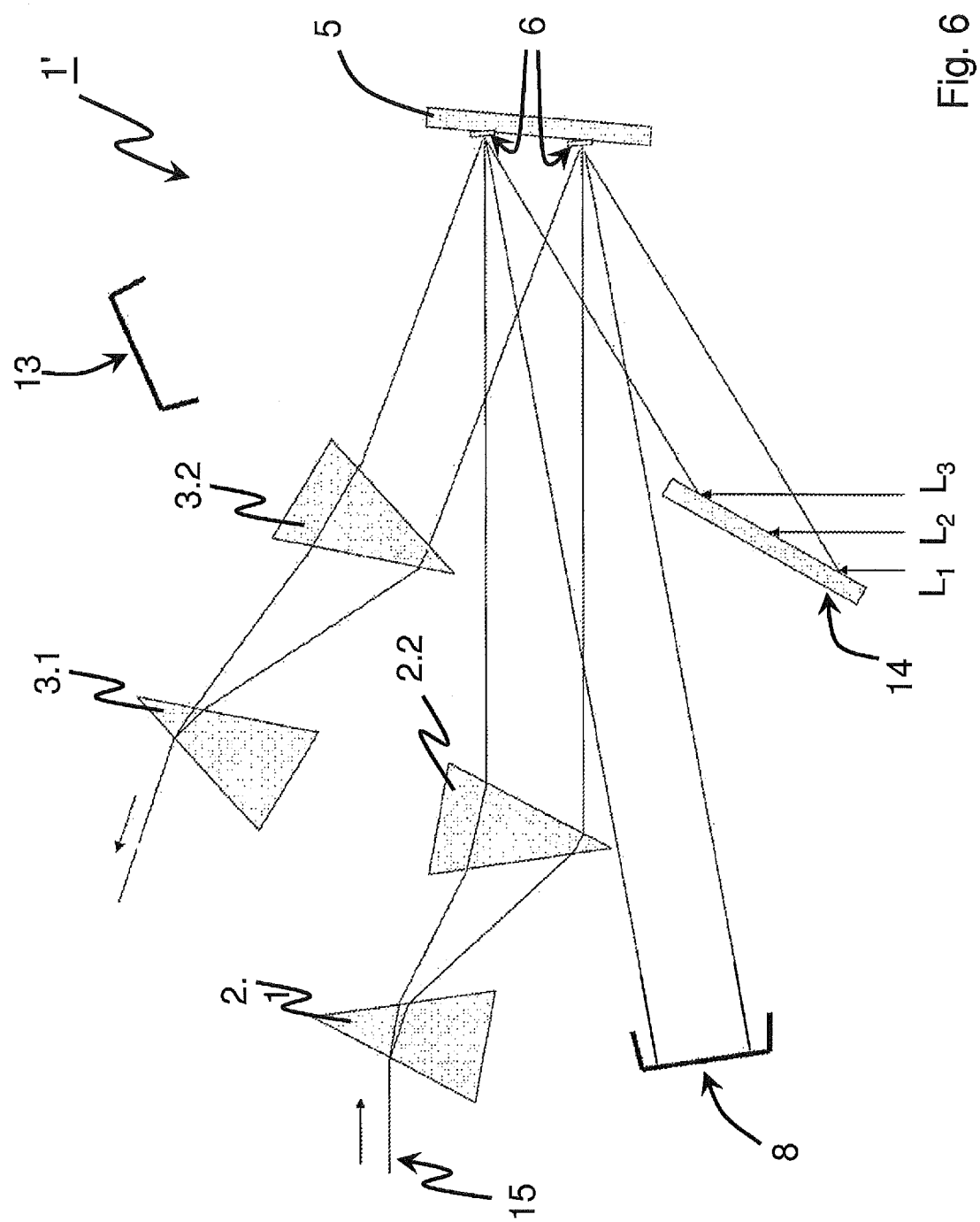
Figure 7:
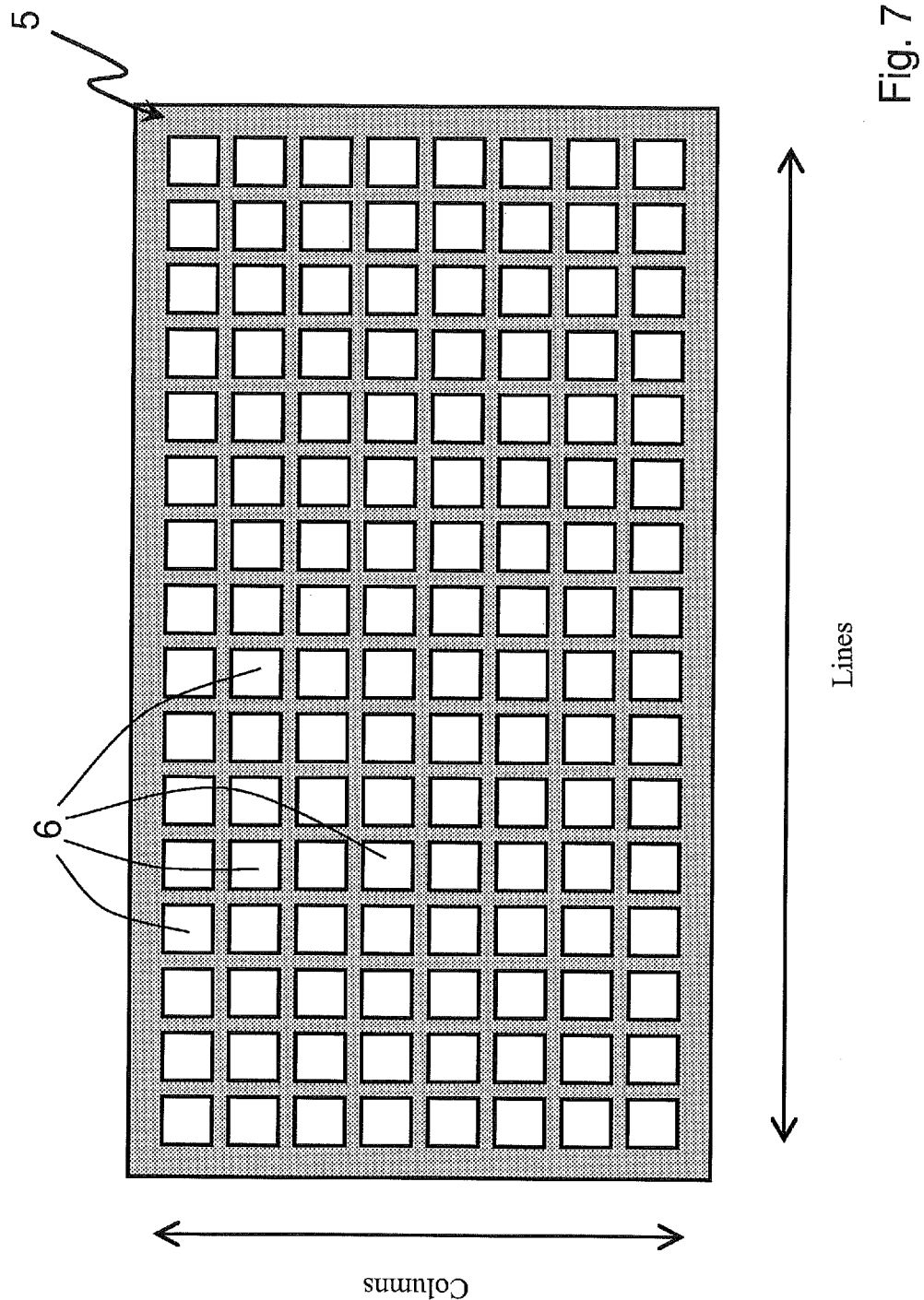

The FIGS. 5 and 6 show a similar arrangement as the FIGS. 1 to 4. The optical arrangement 1' comprises two prism pairs 2, 3, a microstructured element 5, two absorbers 8, 13 and a mirror 14. The arrangement according to FIGS. 5 and 6 can be used for directing one of two coupled in light beams to a point where it is coupled out.

The FIG. 5 shows an arrangement where the segments 6 of the microstructured elements 5 assume a first position. Therefore, a polychromatic light beam that has been coupled into the arrangement and has been chromatically dispersed by means of the prism pair 2 is reflected by the segments 6 into the prism pair 3. The prism pair 3 combines the individual chromatic portions of the spectrum again to a single light beam.

At a second coupling in point individual chromatic portions of the spectrum have already been coupled in. These can for instance be generated by three narrow-band laser light sources. The individual chromatic portions of the spectrum $L_1, L_2, L_3$ incident onto the mirror 14 and are reflected by this mirror onto the segments 6 of the microstructured elements 5. For making the illustration more clear the figure only shows the light paths of the two outer portions of the light. The further path of the light beam $L_2$ is not shown. The light beams $L_1, L_2, L_3$ incident into the absorber 13 when the segments of the microstructured elements 5 assume the first position.

FIG. 6 again shows an arrangement 1' wherein the segments 6 of the microstructured elements 5 assume a second position. Therefore, the light beams $L_1, L_2, L_3$ are guided to the prism pair 3 and are combined by this prism pair to a single light beam. The polychromatic light beam 15 is reflected in the second position of the segments 6 such that it is directed into the absorber 8.

As demonstrated in FIGS. 5 and 6, this creates an arrangement allowing to couple one of two coupled in light beams or light beam bundles out of the optical arrangement in a defined manner. As described in connection with FIGS. 1 to 4 it is also possible that not all of the segments 6 are tilted into a first or into a second position. In contrast, it is possible that a part of the light that has been coupled out can come from the polychromatic light beam 15, while another part is combined from the light beams $L_1, L_2, L_3$. Therefore also individual spectral lines can be mixed, i.e. in the one column of the microstructured elements some of the segments 6 may assume a first position, while other elements may assume a second position. Therefore, the light in one line of the spectrum is combined from both light sources.

Finally, it is particularly emphasized that the embodiment described above was just picked randomly and just serves for demonstrating the teaching of the invention, but that this teaching is not limited to this embodiment. Particularly, the segments of the microstructured elements do not need to assume only two different positions.

List of Reference Numerals
1 optical arrangement
2 prism pair
3 prism pair
4 prism pair
5 microstructured element
6 segment
7 objective
8 absorber
9 detector
10 detector aperture
11 exciting light beam
12 light beam
13 absorber
14 mirror
15 light beam

The invention claimed is:

1. Optical arrangement for use as at least one of a main beam splitter and a beam combiner of a microscope, comprising: an optically dispersive medium chromatically dispersing a coupled in polychromatic light beam in space; at least one controllable microstructured element that is provided downstream of the optically dispersive medium and comprises a DMD (Digital Micromirror Device) having an array of segments, allowing to switch the beam paths within the optical arrangement, resulting in at least one of controlling and influencing of one or more light beams that are coupled out; and an optically combining medium downstream of the controllable microstructured element combining chromatically dispersed light reflected by the DMD into the optically combining medium; wherein the optical arrangement is configured to couple one or more light beams into the arrangement, modify at least one of the one or more light beams by reflecting after chromatic dispersion in space parts of the one or more light beams by the controllable microstructured element into the optically combining medium, and coupling out at least one of the light beams that were coupled in after having passed through the optical combining medium; and microlenses are allocated to the segments of the microstructured elements for focussing the incident light onto these segments and increasing a fill factor for the coupled in light beam incident on the array of segments.

2. Optical arrangement according to claim 1, wherein the beam paths can be switched in the optical arrangement such that a light beam that has been coupled out is processed such that it does at least one of emanating from the desired light beam that was coupled in and of comprising the desired chromatic portions of the spectrum of a light beam that was coupled in.

3. Optical arrangement according to claim 1, wherein at least one of a light beam that was coupled into the optical arrangement and chosen chromatic portions of the spectrum that are not coupled out again from the arrangement in a particular operational mode are directed into an absorber.

4. Optical arrangement according to claim 1, wherein the segments of the microstructured elements are controllable individually or at least in groups of segments.

5. Optical arrangement according to claim 1, wherein the coupled in light beams comprise polychromatic light beams.

6. Optical arrangement according to claim 1, wherein a coupled in light beam comprises a laser beam.

7. Optical arrangement according to claim 1, wherein a coupled in light beam comprises light that is reflected or emitted from a sample or another object.

8. Optical arrangement according to claim 1, wherein the dispersive medium comprises a prism or a grating.

9. Optical arrangement according to claim 1, wherein the dispersive medium is designed as at least one prism pair comprising two prisms that are disposed point-symmetrically in a distance to each other.

10. Optical arrangement according to claim 1, wherein a dispersive medium can be passed by at least one of a plurality of coupled in light beams and of light beams of opposing direction.

11. Optical arrangement according to claim 1, wherein the coupled in light beams are chromatically dispersed in substantially the same direction.

12. Optical arrangement according to claim 1, wherein a chromatically dispersed light beam can be widened substantially perpendicular to the direction of dispersion.

13. Optical arrangement according to claim 1, wherein by means of influencing the segments of the microstructured elements perpendicular to the direction of the chromatic dispersion the intensity of the light beam of one or more chromatic portions of the spectrum can be influenced.

14. Method of controlling and influencing a light beam by means of an optical arrangement for use as at least one of a main beam splitter and a beam combiner of a microscope, comprising: an optically dispersive medium chromatically dispersing a coupled in polychromatic light beam in space; at least one controllable microstructured element that is provided downstream of the optically dispersive medium and comprises a DMD (Digital Micromirror Device) having an array of segments, allowing to switch the beam paths within the optical arrangement, resulting in at least one of controlling and influencing of one or more light beams that are coupled out; and an optically combining medium downstream of the controllable microstructured element combining chromatically dispersed light reflected by the DMD into the optically combining medium; wherein the optical arrangement is adapted configured to couple one or more light beams into the arrangement, modify at least one of the one or more light beams by reflecting after chromatic dispersion in space parts of the one or more light beams by the controllable microstructured element into the optically combining medium, and coupling out at least one of the light beams that were coupled in after having passed through the optical combining medium; and microlenses are allocated to the segments of the microstructured elements for focussing the incident light onto these segments and increasing a fill factor for the coupled in light beam incident on the array of segments; said method comprising: (a) coupling in one or more light beams into the optical arrangement; (b) chromatically dispersing the one or more light beams in space to generate one or more chromatically dispersed light beams; (c) focussing the one or more chromatically dispersed light beams by the microlenses onto the segments; (d) reflecting at least a part of the one or more chromatically dispersed light beams by means of the microstructured element into the beam combiner for combining that at least part of the one or more chromatically dispersed light beams to a light beam to be coupled out; and (e) coupling out the light beam to be coupled out.

15. Method according to claim 14, comprising the method step of chromatically dispersing one or more of the coupled in light beams in space by a dispersive medium.

16. Method according to claim 15, comprising the method step of switching the segments of the microstructured elements substantially perpendicular to the direction of the chromatic dispersion of the coupled in light beams and thereby influencing the intensity of the coupled out light beams or the spectrum of the coupled out light beams.

17. Method according to claim 14, comprising the method step of illuminating a sample by means of the coupled out light beam.

18. Method according to claim 14, comprising the method step of directing the coupled out light beam to a detector.

19. Method according to claim 14, comprising the method step of switching between an operational mode in that a coupled in light beam is coupled out for illuminating a sample, and an operational mode in that the light reflected or emitted by the sample is directed to a detector.

20. Method according to claim 14, comprising the method step of switching the segments of the microstructured elements such that at least one of a plurality of coupled in light beams and groups of light beams are alternatingly coupled out from the arrangement.

21. A microscope comprising the optical arrangement according to claim 1.

22. A method according to claim 14, wherein the optical arrangement is installed in a microscope.

* * * * *